United States Patent [19]

Patrick et al.

[11] Patent Number: 5,734,387
[45] Date of Patent: Mar. 31, 1998

[54] METHOD AND APPARATUS FOR CREATING AND PERFORMING GRAPHICS OPERATIONS ON DEVICE-INDEPENDENT BITMAPS

[75] Inventors: Stuart Raymond Patrick, Issaquah; Amit Chatterjee, Redmond, both of Wash.

[73] Assignee: Microsoft Corporation, Redmond, Wash.

[21] Appl. No.: 328,349

[22] Filed: Oct. 24, 1994

[51] Int. Cl.$^6$ ............................................. G06T 11/00
[52] U.S. Cl. ................................................. 345/441
[58] Field of Search ........................ 395/141, 133–139, 395/500, 650, 162–166; 345/441

[56] References Cited

U.S. PATENT DOCUMENTS 5,434,913  7/1995  Tung et al. ...................... 395/162 X

OTHER PUBLICATIONS

Yao "Borland C++ 4.0 Programming For Windows" pp. 52,53,124–135, 216–221 (1994) and Objet Windows Programmer's Guide.

"Device Driver Adaption Guide" Microsoft Corporation, 1992; Chapters 1, 2 & 10.

*Primary Examiner*—Almis R. Jankus
*Attorney, Agent, or Firm*—Klarquist Sparkman Campbell Leigh & Whinston, LLP

[57] ABSTRACT

Operating system enhancements that enable an application program to create and perform graphics operations on device-independent bitmaps (DIBs) efficiently. The enhancements are in the form of functions that return to the application program a handle to the DIB and a pointer to the location of the DIB in memory. With the handle, the application program can use the capabilities of the operating system to perform graphics operations on the DIB. With the pointer, the application program can use its own drawing capabilities and address the DIB directly. The operating system enhancements also streamline the design and content of graphics drivers such as display drivers by placing basic graphics functions in a graphics engine that communicates with the graphics driver. Simple graphics operations are passed from the graphics driver to the graphics engine, allowing the driver to be limited to more complex operations that utilize special characteristics of graphics hardware associated with the driver.

20 Claims, 7 Drawing Sheets

METHOD AND APPARATUS FOR CREATING AND PERFORMING GRAPHICS OPERATIONS ON DEVICE-INDEPENDENT BITMAPS

FIELD OF THE INVENTION

This invention relates generally to computer graphics. More particularly, this invention relates to method and apparatus for enabling an application program to efficiently draw bitmapped images in a standard format that is independent of the device on which the images are created or displayed. Bitmaps of this format are known as device-independent bitmaps, or DIBs. The invention also relates to method and apparatus for simplifying the design of graphics drivers such as display drivers for displaying such bitmaps.

BACKGROUND OF THE INVENTION

In the field of computer graphics, there are two common ways of storing pictorial information: bitmaps and metafiles. A metafile stores an image as a series of instructions that draw the image, such as instructions to draw a circle, add text, etc. A bitmap, on the other hand, is a complete digital representation of an image. Each pixel in the image corresponds to one or more bits in the bitmap. Monochrome bitmaps require only one bit per pixel; color bitmaps require additional bits to indicate the color of each pixel. Bitmaps can exist in a computer's memory or can be stored on a disk or other storage device as files.

Bitmaps have the advantage over metafiles in the time required to generate an image. Copying a bitmap from memory or storage to a video display is much faster than rendering an image using a metafile. However, bitmaps have a number of drawbacks. They are in many respects device dependent, such as for color and spatial resolutions. For example, displaying a color bitmap on a monochrome display device is often unsatisfactory. And where the spatial resolution of the bitmap (i.e., number of pixels in each row and column of the bitmap) differs from the display device, the displayed bitmap is often distorted.

Recognizing the value of bitmaps and their drawbacks, computer operating systems have been designed to support device-independent bitmaps, or DIBs. Because their format is independent of a particular display device's requirements, DIBs have the advantage over other bitmaps (often referred to as device-dependent bitmaps) in that they may easily be used by other application programs and may be displayed on other display devices. The DIB format is well documented in the literature, such as in *Programming Windows 3.1*, available from Microsoft Press. Briefly, a DIB file typically includes a structure with a number of information fields that specify the width and height of the bitmap in pixels, the color bits per pixel and other pertinent information. These fields are followed by a color table if the DIB has 8 or fewer bits per pixel. For bitmaps of a certain number of bits per pixel, the table includes entries that specify the intensity of the red, green and blue color for a pixel. A DIB file concludes with an array of bits that define the particular bitmap image, with a number of bits representing each pixel of the image. The bits representing a particular pixel serve as an index into the color table, thereby specifying the color for the pixel.

However, the present process for enabling an application program to use the DIB format is inefficient. Typically, an application program can presently draw onto a DIB in one of two ways. In the first way, the application program includes special code that allows it to create a DIB in memory and then draw onto a DIB. This approach, while taking full advantage of the application program's drawing capability, has drawbacks. It requires that the code perform all of the graphics routines, even such simple routines as drawing a line or rectangle. These routines are expensive to write and duplicate many of the drawing routines offered by the operating system. In the second way, the application program uses the capability of the computer's operating system for working with DIBs. This second approach is simpler from the viewpoint of the application program, but is more time consuming and more limited in capability than the first approach. With respect to time, the application program must make several calls to the operating system. For example, to draw onto a DIB using the Windows operating environment from Microsoft Corp. of Redmond, Wash., the application program calls a function within Windows to draw onto a device-dependent bitmap, or DDB. The application then calls another function to transfer the DDB into the DIB. With respect to drawing capability, operating systems such as Windows typically have only a few functions for drawing figures. To draw more fanciful figures, the application program must use the first approach.

The first approach may combined with the second approach to minimize the complexity of the application program. The application program then handles drawing of the more difficult shapes and the operating system handles drawing of the simpler shapes such as rectangles, circles, etc. But this combined approach requires even more function calls between the application program and the operating system.

Related to the use of the operating system to draw onto a bitmap is the role of graphics drivers such as display drivers or printer drivers. A graphics driver is a module of code that operates a graphics device such as a display device or printer and includes within it a collection of graphics functions designed to work with a particular graphics device. The operating system calls these graphics functions to interact with a particular graphics device. Typically each graphics device has its own graphics driver, which is written to take advantage of the particular capabilities of the graphics device. When an operating system receives a function call from an application program to perform a drawing operation, the system makes a similar call to a graphics driver. The graphics driver then carries out the graphics operation on the graphics device.

A drawback of present graphics drivers is their duplication of code. For example, typically there are display drivers for a number of common display devices such as EGA and VGA displays resident in memory at the same time. Each of these drivers contains similar graphics functions, resulting in a substantial duplication of code resident in memory.

Another drawback of graphics drivers is their complexity. Many display devices have special characteristics that require display drivers to be written to take advantage of these characteristics. A true color (24-bit) display card, for example, may require a display driver that is not supplied with the operating system software. The supplier of the card must then provide the required display driver. To do so, the supplier must have intimate knowledge of the operating system that interacts with the display driver. Gaining that knowledge and writing the appropriate code is a time consuming and expensive process.

The objects of the invention are therefore several. One object is to provide an operating system that allows an application program to draw onto device-independent bitmaps in an efficient manner. The application program should not require special code to perform the drawing. If the application program desires to use the drawing capabilities of the operating system to draw onto a DIB, the steps required for doing so should be minimized. A second object is to provide an operating system that can support drawing by the application program onto other bitmaps and output devices without the need for complex and redundant code in the graphics drivers. For example, each display driver should contain only code that takes advantage of its display device's unique characteristics. Redundant code for drawing functions that are common to all display drivers should be removed, and those functions left to the operating system. This change in display driver responsibility reduces the amount of code required to be resident in main memory. This change also simplifies the writing of such graphics drivers.

SUMMARY OF THE INVENTION

A method and apparatus in accordance with the invention is disclosed for enabling an application program to use the operating system to create a device-independent bitmap on which the application may then perform graphics operations. The method includes accessing a data structure describing a desired format for the bitmap. A bitmap is then created according to the desired format. The bitmap is identified to both the operating system and to the application program, enabling the application program to perform graphics operations on the bitmap directly or through the facilities of the operating system.

In one embodiment of the invention, the operating system includes a graphics interface and a graphics engine. The application program calls a first function in the graphics interface to create the DIB. The graphics interface, in turn, calls a second function in the graphics engine to create the DIB. The graphics engine returns to the graphics interface a means for identifying the bitmap to the application program, such as a pointer to the DIB's memory location. The graphics interface then returns to the application program a means for identifying the bitmap to the operating system and the means for identifying the bitmap to the application program.

In another aspect of the invention, the graphics engine carries out drawing operations that previously have been incorporated into graphics drivers. This reduces the tasks of graphics drivers, allowing their code to be limited to handling any special characteristics of the graphics hardware associated with the graphics driver. In the method of the invention, a function call is made to the graphics driver to perform a graphics operation. The graphics driver then determines whether the graphics operation is of a type that the graphics engine may perform. If it is, the graphics driver calls a function in the graphics engine to perform the operation. If it is not, the graphics driver performs the operation.

The foregoing and other objects, features, and advantages of the invention will become more apparent from the following detailed description of a preferred embodiment which proceeds with reference to the accompanying drawings.

DETAILED DESCRIPTION OF A PREFERRED EMBODIMENT

Figure 1:
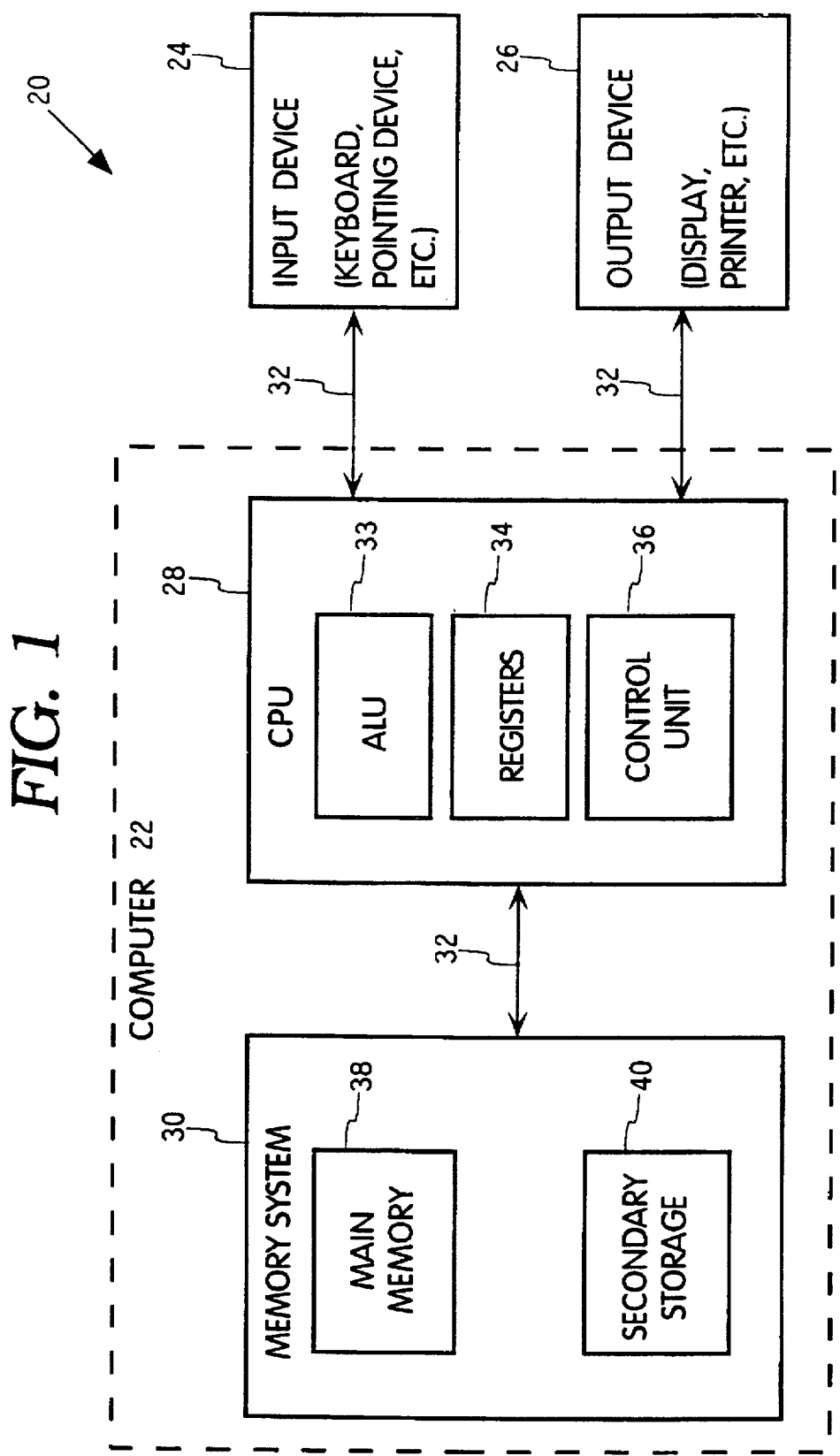
FIG. 1 is a block diagram of a computer system that may be used to implement a method and apparatus embodying the invention.

FIG. 1 is a block diagram of a computer system 20 which is used to implement a method and apparatus embodying the invention. Computer system 20 includes as its basic elements a computer 22, input device 24 and output device 26.

Computer 22 generally includes a central processing unit (CPU) 28 and a memory system 30 that communicate through a bus structure 32. CPU 28 includes an arithmetic logic unit (ALU) 33 for performing computations, registers 34 for temporary storage of data and instructions and a control unit 36 for controlling the operation of computer system 20 in response to instructions from a computer program such as an application or an operating system.

Memory system 30 generally includes high-speed main memory 38 in the form of a medium such as random access memory (RAM) and read only memory (ROM) semiconductor devices and secondary storage 40 in the form of a medium such as floppy disks, hard disks, tape, CD-ROM, etc. and other devices that use optical or magnetic recording material. Main memory 38 stores programs such as a computer's operating system and currently running application programs. Main memory 38 also includes video display memory for displaying images through a display device.

Input device 24 and output device 26 are typically peripheral devices connected by bus structure 32 to computer 22. Input device 24 may be a keyboard, modem, pointing device, pen, or other device for providing input data to the computer. Output device 26 may be a display device, printer, sound device or other device for providing output data from the computer.

It should be understood that FIG. 1 is a block diagram illustrating the basic elements of a computer system; the figure is not intended to illustrate a specific architecture for a computer system 20. For example, no particular bus structure is shown because various bus structures known in the field of computer design may be used to interconnect the elements of the computer system in a number of ways, as desired. CPU 28 may be comprised of a discrete ALU 33, registers 34 and control unit 36 or may be a single device in which these parts of the CPU are integrated together, such as in a microprocessor. Moreover, the number and arrangement of the elements of the computer system may be varied from what is shown and described in ways known in the art (i.e., multiple CPUs, client-server systems, computer networking, etc.).

Figure 2:
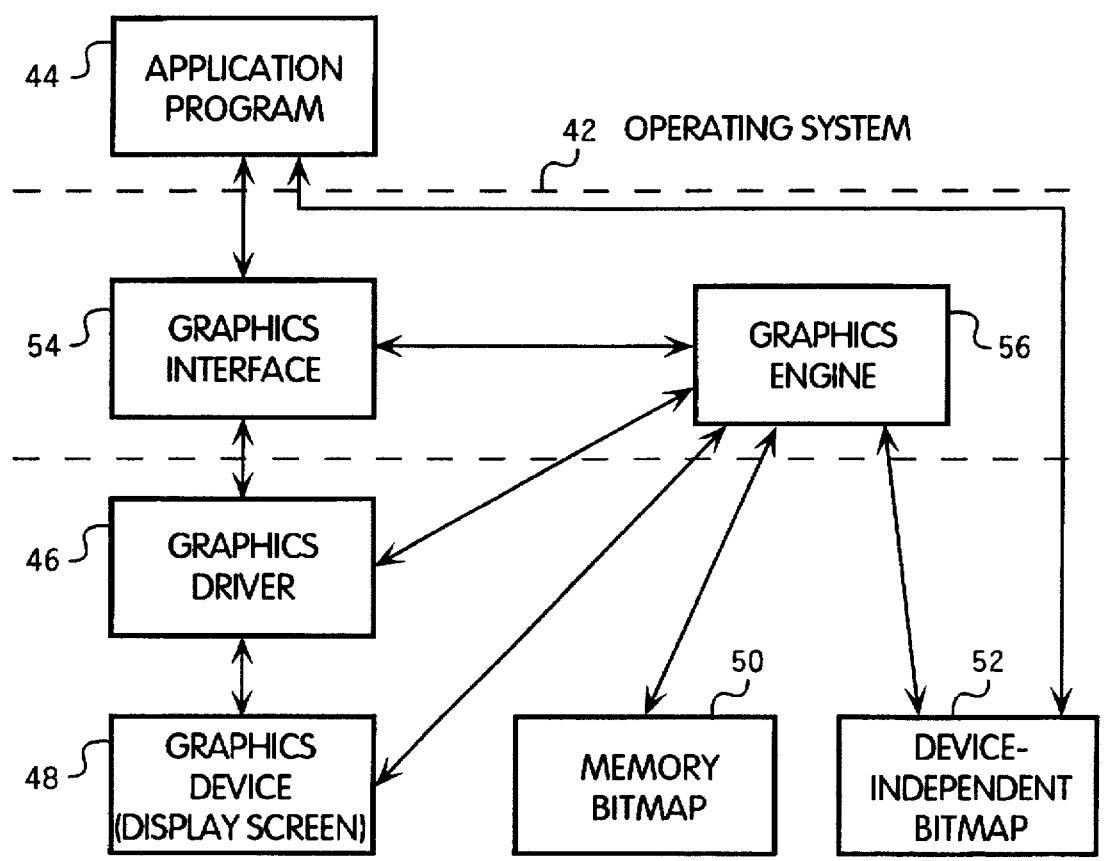
FIG. 2 is a block diagram of an application program, operating system, graphics driver and graphics device within a computer system such as shown in FIG. 1.

FIG. 2 is a block diagram of a portion of an operating system 42 in communication with an application program 44 and a graphics driver 46. These elements are preferably resident in main memory 38, but they may also reside in secondary storage 40 and be swapped in and out of the main memory as needed. Operating system 42 further communicates with a graphics device 48, memory bitmaps 50 and device-independent bitmaps 52. Graphics device 48 includes devices such as a graphics adapter that includes display screen memory or a printer that includes a memory buffer. Within the illustrated portion of operating system 42 are a graphics interface 54 and a graphics engine 56. Each of the blocks in FIG. 2 except for graphics device 48 and bitmaps 50, 52 is typically implemented as a module of code containing a set of related functions.

This, of course, is only a description of the preferred embodiment. Graphics engine 56 or its equivalent may also be contained in the graphics interface or other parts of operating system 42.

For drawing onto a display screen (the display memory surface, or frame buffer, for the graphics device), graphics interface 54 interacts with a graphics device 48 (FIG. 1) through a graphics driver 46. A graphics driver such as a display driver is a module containing a set of functions designed for accommodating a particular graphics display device, such as a true color display adapter, a display accelerator, etc. A display driver also contains device-specific code needed to carry out particular graphics operations on the device. Function calls from an application program 44 to functions in graphics interface 54 are translated by the graphics interface into corresponding calls to functions in a graphics driver 46 for the particular device 48. These graphics driver functions then execute instructions for drawing graphics or performing other graphics operations on the display screen. Depending on the capabilities of the display device, graphics interface 54 may generate many calls to a graphics driver 46 from a single call from an application program 44.

In the preferred embodiment of the invention, graphics interface 54 may also interact with a graphics device 48 through graphics engine 56. This interaction occurs both directly through the graphics engine and indirectly through a graphics driver 46, depending on the purpose for which the graphics engine is invoked. The interaction is direct if graphics interface 54 is called by an application program 44 to create or draw onto a memory surface defining a device-independent bitmap (DIB) 52. In this case, graphics interface 54 calls a function in graphics engine 56. The graphics engine in turn creates or draws directly onto a DIB 52 in main memory 38. As part of its execution of the function for creating a DIB, graphics engine 56 returns a means for identifying the DIB to graphics interface 54 such as a pointer to the memory location for the DIB's bits. The graphics interface in turn passes this pointer in a "pointer to a pointer" to application program 44 to enable the program to draw directly onto the DIB without the involvement and inherent drawing limitations of operating system 42. This direct communication between DIB 52 and application program 44 is indicated in FIG. 2 by a long arrow on the right side of the figure.

The interaction between graphics interface 54 and graphics engine 56 is indirect if the graphics interface is asked by an application program 44 to draw onto the memory surface defining the display screen. This interaction is described generally above wherein graphics interface 54 calls a function in graphics driver 46 to draw onto the display screen of graphics device 48. Graphics driver 46 examines the function call to determine if the requested function may be performed by the graphics engine. If executing the function requires access to unusual or unique features of the graphics device such as color conversion, then the graphics driver carries out the function's operation. However, if executing the function does not require such access, then graphics driver 46 calls an appropriate function in the graphics engine, which carries out the requested graphics operation. In this way, each of the graphics drivers 46 does not have to include code for common drawing operations such as creating rectangles, lines, etc., but can be limited to code necessary to utilize unique features of their respective unique graphics devices. By placing the code for carrying out common graphics operations in graphics engine 56 rather than in all of the graphics drivers, a substantial duplication of code is avoided and the display drivers may be much simpler in design.

This indirect interaction through graphics driver 46 also occurs when the function call from graphics interface 54 to the graphics driver involves performing graphics operations on a memory surface defining a memory bitmap 50 that is not created specifically as a DIB, but generally has the format of a DIB. These bitmaps are created and stored in main memory 38 for various purposes, such as for transferring a bitmapped image to a display screen. Graphics engine 56 may be used for creating and drawing onto these memory bitmaps.

Figure 3:
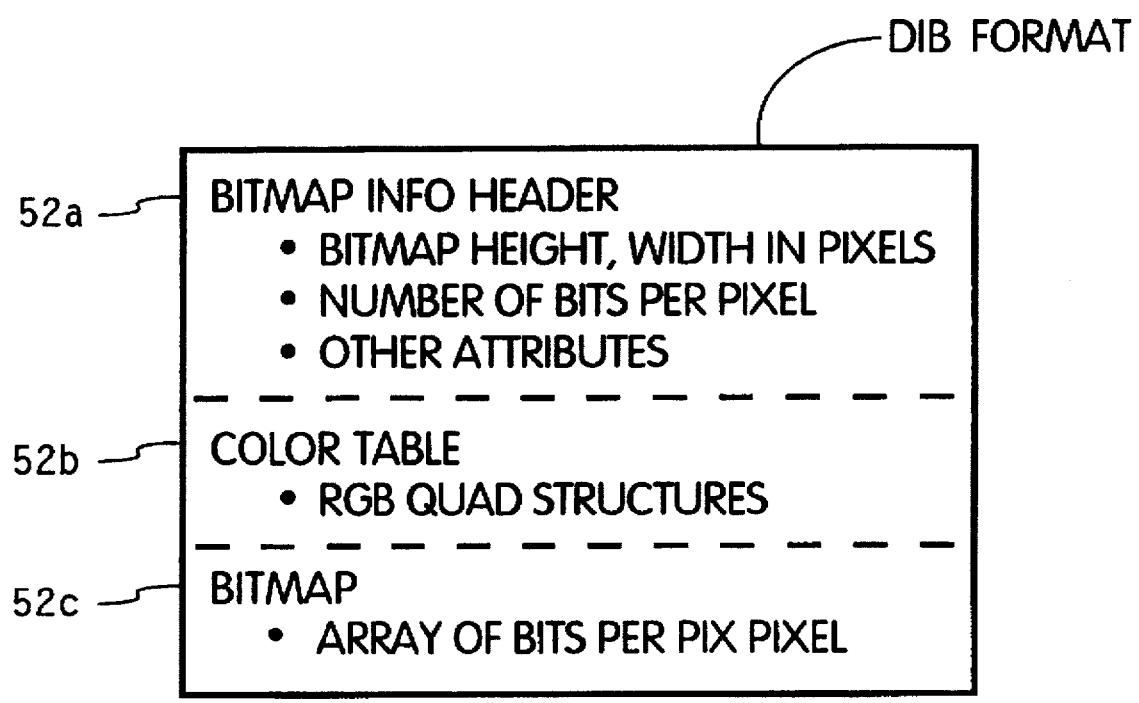
FIG. 3 is a block diagram of a device-independent bitmap format.

The device-independent format of a DIB 52 is shown in FIG. 3. A typical file format for a DIB includes a header structure 52a that provides information about the bitmap. This information includes the height and width of the desired bitmap in pixels, such as 100 by 200 pixels. Header 52a also indicates the number of color bits per pixels, such as eight or 16, and other attributes of the DIB. Color table 52b, if present, provides a color for each of the possible bit combinations for a pixel. For example, if the DIB specifies eight bits per pixel, then the color table has 256 entries, with each possible bit combination being a separate index into the color table. The entries in the color table, in turn, may represent indices into a color palette or represent colors directly. Bitmap 52c consists of an array of the bits for each pixel of the bitmap. For example, a 100 by 200 bitmap with a color depth of eight bits per pixel would have an array of 100*200*8=160,000 bits. For the purposes of the invention, these are the pertinent portions of the format DIB. A more detailed description of a DIB file format may be found in a number of references, including *Programming Windows 3.1* noted above.

Figure 4:
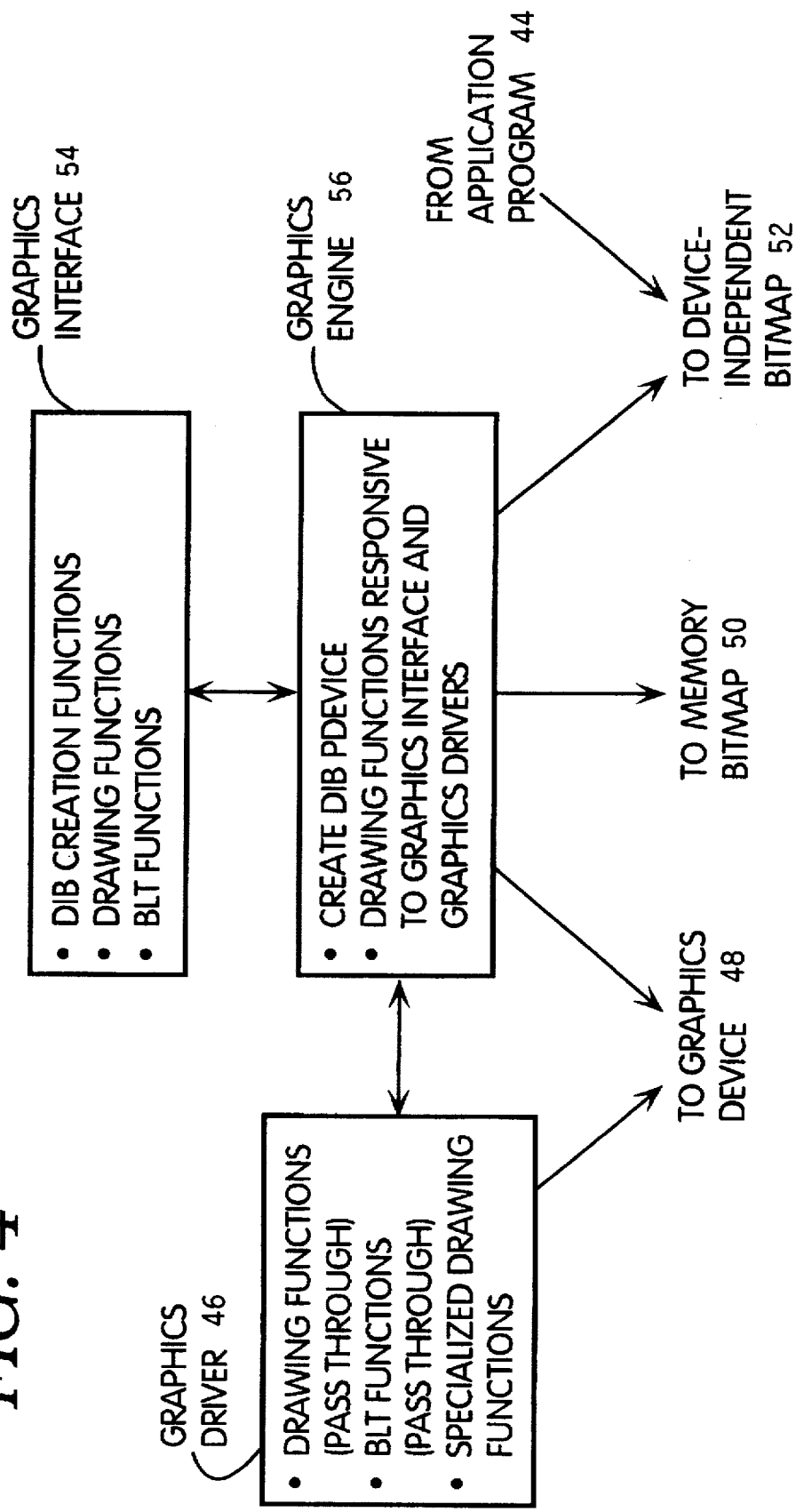
FIG. 4 is a more detailed view of the graphics interface, graphics drivers and graphics engine modules in the diagram of FIG. 2.

FIG. 4 is a more detailed view of the contents of graphics interface 54, graphics drivers 46, and graphics engine 56 in the preferred embodiment. A set of functions defining the graphics interface are collected in a module of operating system 42. This module is a self-contained unit whose code is physically separate from the code of other modules of the operating system. Within graphics interface 54 are functions for creating bitmaps, drawing onto these bitmaps and onto the screen display, and copying bitmaps from one memory surface to another (bit functions). Also included are functions unique to the present invention for enabling an application program to draw directly or indirectly onto DIBs, as generally explained above. An example of a function for enabling an application program to create a DIB is defined in Table I:

TABLE I

CreateDIBSection
hBITMAP CreateDIBSection (hdc, IpInfo, dwUsage, IpIpBits, hSection, dwOffset)
hdc;                    //handle of device context
BITMAPINFO *IpInfo;     //address of bitmap size and format data TABLE I-continued

| | |
|---|---|
| dwUsage; | //color data usage |
| **lplpBits; | //address of buffer that receives the address of the bitmap bits |
| hSection; | //handle of a memory mapped object |
| dwOffset; | //offset to the bitmap bits |

The parameters to the function are several. The parameter hdc is the handle of a device context for the newly created DIB. The parameter lpinfo is a pointer from application program 44 to a data structure that includes the BitMapInfo header structure and color table (FIG. 3, 52a and 52b). This data structure describes a desired format of the device-independent bitmap to be created. The parameter dwUsage specifies whether the entries in the color table represent palette indices or actual colors. The parameter lplpBits is a "pointer to a pointer" to a memory location for the bitmap bits (FIG. 3, 52c). The handle hBitmap identifies the device-independent bitmap being created to operating system 42. Within the definition of the function is also a call to a memory allocator, such as to a function in graphics engine 56, which allocates memory for the bitmap bits. After execution, the function returns the bitmap bits pointer and the bitmap handle to the application program. A more complete explanation of the function CreateDIBSection appears in Appendix A.

This is, of course, only a preferred form of a function for creating a DIB. Equivalent function definitions with parameters, data structures, and global may also be used. For example, the pointer lpinfo may be viewed conceptually as one form of a means for accessing a desired format of a device-independent bitmap to be created. Other equivalent forms include but are not limited to a data structure as a function parameter or a global variable to identify the bitmap format. The pointer lplpBits is just one form of a means for identifying the bitmap to the application program. Other equivalent forms include but are not limited to a data structure as a function parameter or a global variable to identify the bitmap. The handle hbitmap is only one form of a means for identifying the bitmap to the operating system. Data structures, global variables and other techniques known in the art may also be used as noted above. The function call to graphics engine 56 is just one form of a means for creating a device-independent bitmap of the desired format. Graphics interface itself may contain the necessary code, or it may make calls to other modules in addition or instead of to the graphics engine.

FIG. 4 also shows a preferred form of graphics engine 56. The graphics engine is also a module that contains a set of functions for creating a DIB and for performing graphics operations on DIBs, other bitmaps and physical devices. These functions include drawing and copying functions (known as "blitting"). They also contain a function for creating a DIB in response to a function call from graphics interface 54, such as the following function in Table II below:

TABLE II

CreateDIBPDevice
CreateDIBPDevice (CDP_DibInfo, CDP_Pdevice, CDP_lpBits, CDS_Flags)
    Converts a BITMAPINFO structure into a DIB PDevice structure.
CDP_DibInfo    //pointer to the Info structure.
CDP_PDevice    //buffer to hold DIB PDevice structure TABLE II-continued

| | |
|---|---|
| CDP_lpBits | //pointer to bits. If this is 0, the function will fill in the offset part of deBits assuming that the caller will allocate a 0 based buffer and fill in the selector for the buffer later. |
| CDS_Flags | //used to initialize the deFlags field. |
| Exit: | |
| | eax = size of the bits buffer, if successful. |
| | eax = 0 if failure. |

The parameters passed from graphics interface 54 in this function call are several. The parameter DibInfo is a pointer to the BitMapInfo structure described above and derived from the pointer lpInfo. The parameter Pdevice is a pointer to a block of memory that contains a DIB pdevice structure, to be described. The parameter lpBits points to the location of the bitmap bits. These and other parameters are more fully described in Appendix B, which gives a detailed description of a preferred form of this function, CreateDIBPDevice. As with the graphics interface functions, these are only preferred forms of means for accessing and identifying data. Data structures, global variables and other techniques may also be used in a function as noted above. Equivalent functions and other techniques may also be used. Upon execution of this function, graphics engine 56 fills in the contents of a pdevice structure buffer allocated by graphics interface 54 and pointed to by the pointer lpBits.

Figure 5:
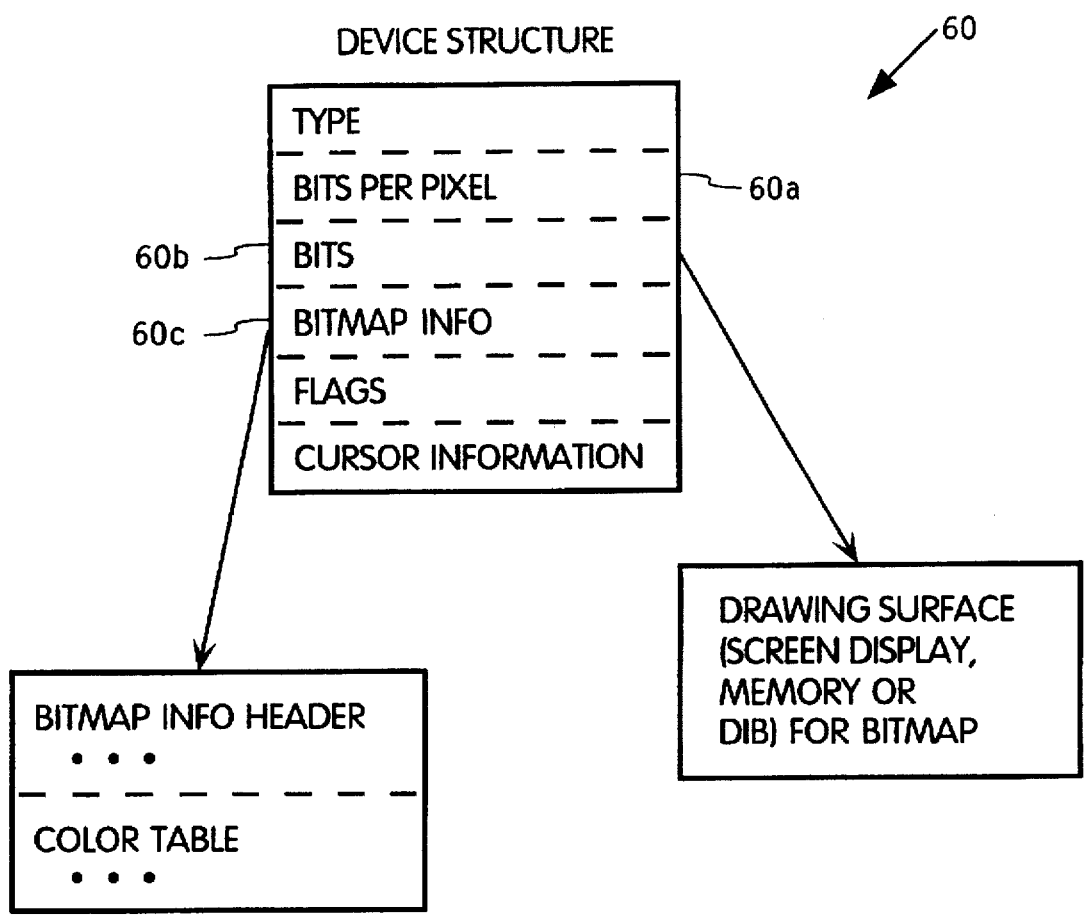
FIG. 5 is a block diagram of a device structure for passing data to a graphics driver or graphics engine.

A DIB pdevice structure 60 is shown in the block diagram of FIG. 5. The pdevice structure is passed as a parameter to graphics engine 56 and describes the format of a DIB to be created. The structure includes a number of fields whose data is derived from the parameters passed by graphics interface 54. Of particular relevance are BitsPerPixel field 60a, Bits field 60b and BitMapInfo field 60c. BitsPerPixel field 60a indicates the number of bits for each pixel in the DIB to be created. Bits field 60b identifies the drawing surface for the DIB, that is, the memory location where the DIB will reside. BitMapInfo field 60c points to a data structure that describes the format of the DIB, the pixel characteristics and the color table.

FIG. 4 further shows a preferred form of a graphics driver 46. The graphics driver include drawing functions that may be called by graphics interface 54 to draw onto non-DIB bitmaps, such as the screen display of graphics device 48 and memory bitmaps 50. However, these drawing and blitting functions pass the drawing or copying tasks through to graphics engine 56 whenever possible. Only specialized drawing functions that require manipulation of the display hardware remain fully in the display driver. Drawing is thus centralized to a degree within graphics engine 56, reducing the duplication of code among the modules.

Figure 6:
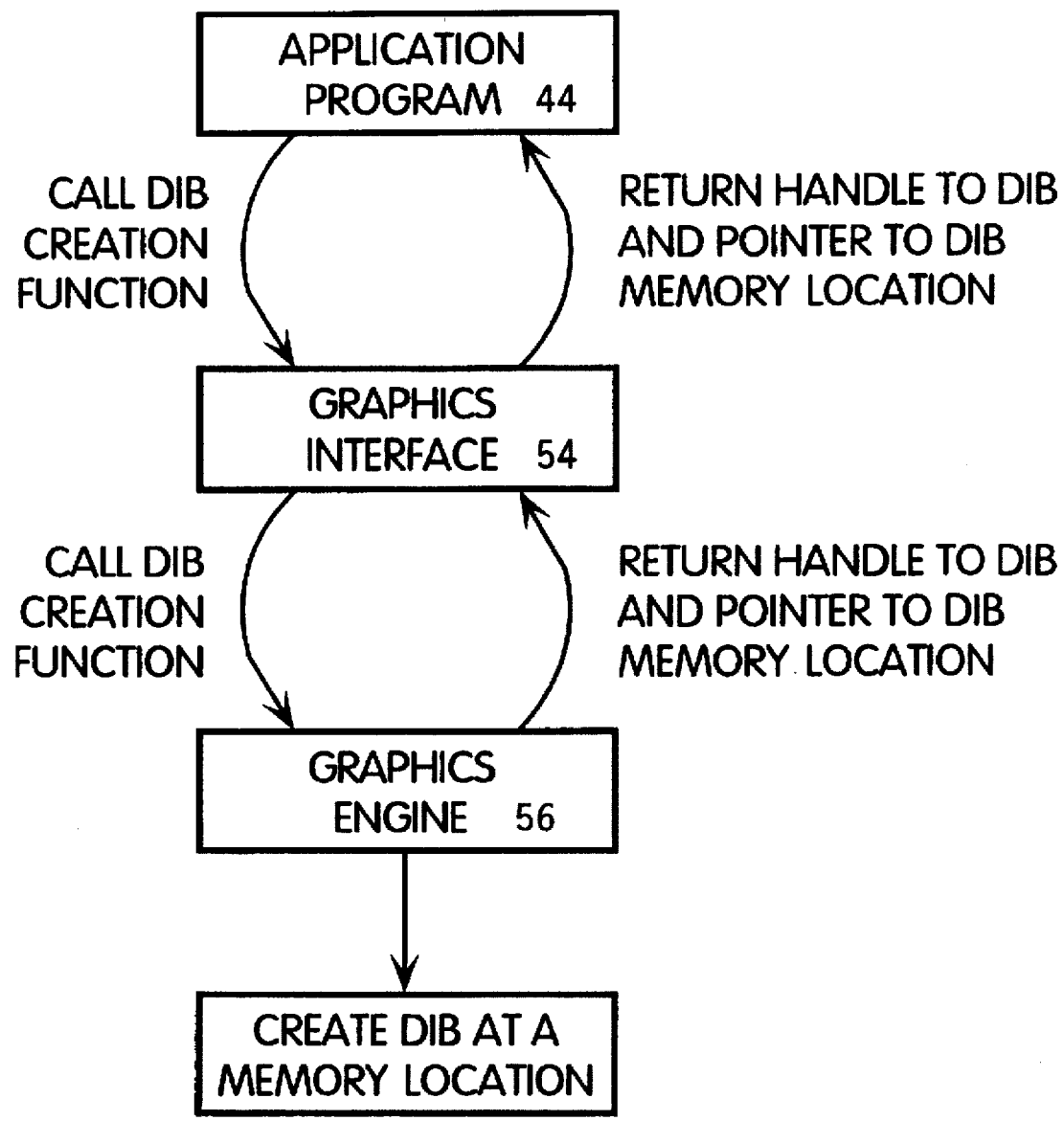
FIG. 6 is a data flow diagram showing how the operating system in the present embodiment enables an application program to create a device-independent bitmap.

The details of the interaction of graphics interface 54 with graphics engine 56 in the preferred embodiment will now be described with reference to FIGS. 4–6. When an application program 44 desires to create a DIB, it makes a function call to graphics interface 54, passing the interface a pointer to a memory location where the format of the DIB is stored. In the preferred embodiment, this function call is to the function CreateDIBSection, and the pointer passed is lpInfo. The application program may also pass pointers to an existing DIB, hSection and dwOffset, if it is desired to modify an existing DIB. Other parameters passed by the application program may indicate the nature of the color table (dwUsage) and a device handle (hdc). This is summarized in FIG. 6 as a call to a DIB creation function.

Graphics interface 54 responds to this function call by executing the corresponding function. As part of that execution, the graphics interface computes values, calls a second function within graphics engine 56 and passes these values as parameters to the second function. In the preferred embodiment, the corresponding function is CreateDIBPDevice. The parameters passed include a pointer to the DIB format (DibInfo) and a pointer to DIB pdevice structure 60 that indicates the memory location for the DIB (Pdevice). This is illustrated in FIG. 6 as a call to a DIB creation function within graphics engine 56. The graphics engine then allocates the memory for the DIB required for the format specified.

These two functions return values to their calling environments. Graphics engine 56 returns to graphics interface 54 a pointer to the memory location for the DIB bits. The pointer is the parameter lpBits in the CreateDIBPDevice function. Graphics interface 54, in turn, returns to application program 44 a pointer to a buffer that contains the memory for the DIB bits and a handle identifying the DIB to the operating system. The handle is an index into a table in graphics interface 54 whose entries identify the nature and location of objects such as bitmaps. The handle is hBitmap and the "pointer to a pointer" is the parameter lplpBits in the CreateDIBSection function.

Application program 44 may now draw or copy onto the DIB directly using its own facilities and the pointer lplpBits or indirectly through the facilities of operating system 42 and the handle hBitmap. How the drawing is handled varies by operating system. In the Windows environment, for example, the graphics interface is called by the application program to create a memory device context and then to select the bitmap into the memory device context. The bitmap may then be drawn or otherwise manipulated in the memory device context.

Figure 7:
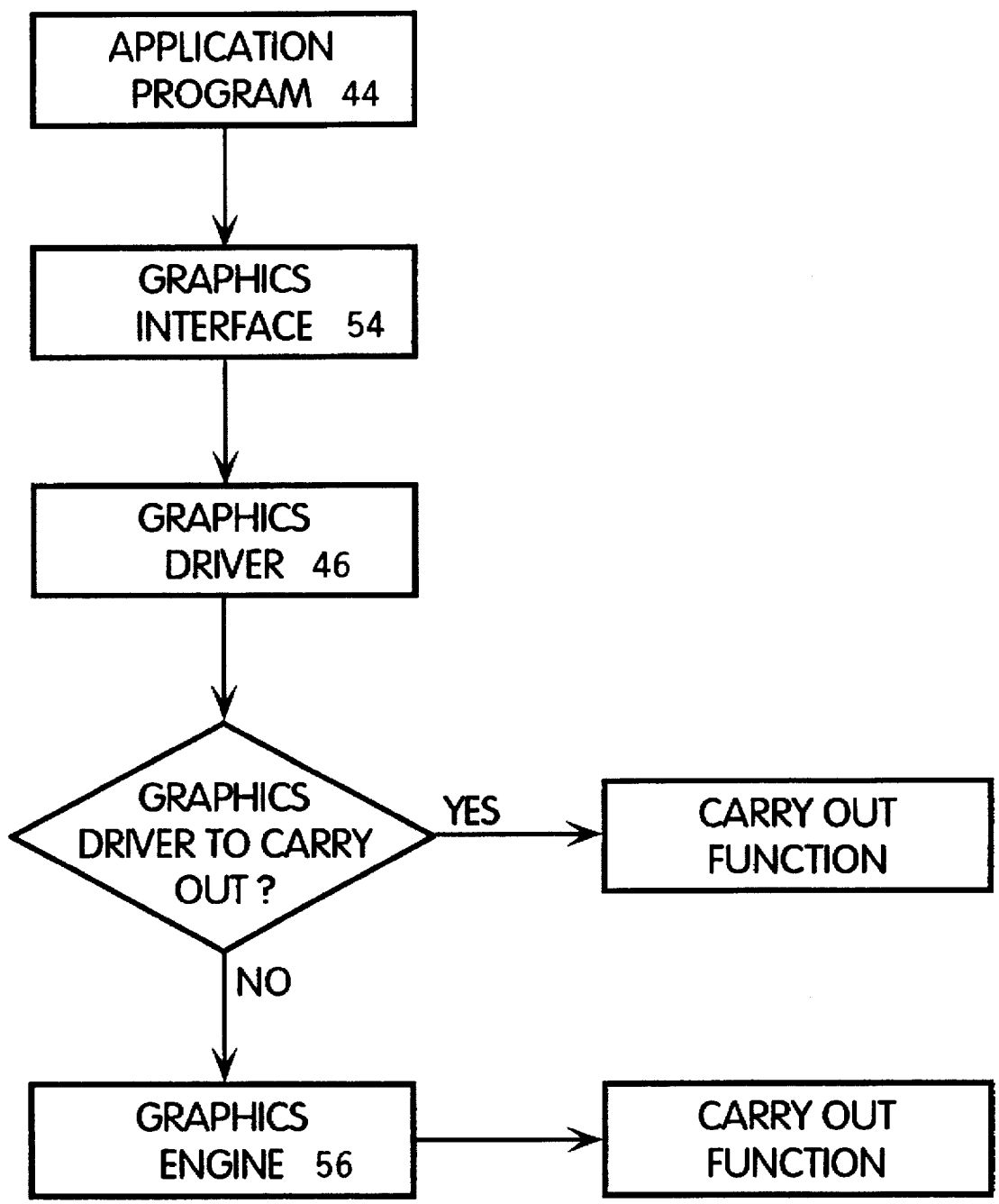
FIG. 7 is a data flow diagram showing how the operating system divides the performance of graphics operations between a graphics driver and a graphics engine.

The details of the interaction of graphics interface 54, graphics driver 46 and graphics engine 56 in the preferred embodiment for drawing onto memory surfaces supporting other bitmaps will now be described with reference to FIGS. 4, 5 and 7. As a preliminary to drawing or other graphics functions, a bitmap must be created as described. A memory device context must also be created, and then the bitmap associated with the memory device context. The handle of the memory device context is then communicated to the application program for its use in utilizing the operating system to draw onto bitmaps.

When the application program desires to draw onto a memory bitmap or onto a physical device itself such as the screen display of graphics device 48, it calls an appropriate function within graphics interface 54. This is indicated in FIG. 7. These functions include drawing functions, blitting functions and others. Graphics interface 54, in turn, calls an appropriate function in a graphics driver 46. The graphics driver in response determines if it is capable of performing the graphics operation represented by the function. If it is a function that does not require resort to the special characteristics of the display hardware, then display driver passes the function to graphics engine 56, which carries out the operation. If the function does require manipulation of the display hardware, the display driver carries out the function.

The above description of the functions that may be employed in the preferred embodiment sets forth the required information for writing the associated function definitions. Any detailed programming connected therewith is well within the skill of the art.

In view of the many possible embodiments to which the principles of our invention may be applied, it should be recognized that the illustrated embodiment is only a preferred example of the invention and should not be taken as a limitation on the scope of the invention. For example, the module definitions may be changed so that the various functions of the graphics engine and graphics drivers are incorporated into one another or into the graphics interface. Parameters for functions maybe pointers, data structures or other equivalent means. Global variables may be used to communicate among functions. The invention should therefore be considered limited only by the following claims. We claim as our invention all that comes within the scope and spirit of these claims.

57 CreateDIBSection hBITMAP CreateDIBSection *(hdc, lpInfo, dwUsage, lplpBits, hSection, dwOffset)*

| | |
|---|---|
| *hdc;* | //handle of device context |
| BITMAPINFO *\*lpInfo;* | //address of bitmap size and format data |
| *dwUsage;* | //color data usage |
| *\*\*lplpBits;* | //address of buffer that receives the address of the bitmap bits |
| *hSection;* | //handle of a memory mapped object |
| *dwOffset;* | //offset to the bitmap bits |

The CreateDIBSection function creates a device-independent bitmap to which both the graphics interface and applications can directly write.

parameters   *hdc*

Handle of a device context (DC) for providing objects.

*lpInfo*

Points to a BITMAPINFO structure that describes the desired format of the bitmap to create including the pixel width, pixel height, color depth, and color table for the bitmap.

The BITMAPINFO structure has the following form:

```
typedef struct tagBITMAPINFO { // bmi

BITMAPINFOHEADER bmiHeader;

RGBQUAD         bmiColors[1];

} BITMAPINFO;
```

*Usage*

>Specifies whether the *bmiColors* member of the BITMAPINFO structure contains explicit red, green, and blue (RGB) values or palette indices. The dwUsage parameter must be one of the following values:

| Value | Meaning |
| --- | --- |
| DIB_PAL_COLORS | The color table consists of an array of 16-bit indices into the logical palette of the DC into which the bitmap is to be selected. |
| DIB_RGB_COLORS | The color table contains literal RGB values. |

*lplpBits*

>Points to a buffer that receives the address of the bitmap bits. This field can be NULL in which case the address of the bitmap bits is not returned to the caller on this call.

*hSection*

Identifies a memory mapped object from which the bitmap should be created.

If *hSection* is NULL, the graphics interface allocates the memory mapped object for the application and ignores the *dwOffset* parameter.

*dwOffset*

The byte offset from the base memory location given by hSection

---

APPENDIX A

| | | |
|---|---|---|
| MLB:kf/kj 3382-40267 | -22- | PATENT |

58 CreateDIBPDevice

CreateDIBPDevice *(CDP_DibInfo, CDP_Pdevice, CDP_lpBits, CDS_Flags)*
Converts a BITMAPINFO structure into a DIB PDevice structure.

| | |
|---|---|
| CDP_*DibInfo* | //pointer to the Info structure. |
| CDP_*PDevice* | //buffer to DIB PDevice structure |
| CDP_*lpBits* | //pointer to bits. |

If this is 0, the function will fill in the offset part of deBits assuming that the caller will allocate a 0 based buffer and fill in the selector for the buffer later.

| | |
|---|---|
| CDS_*Flags* | //used to initialize the deFlags field. |

Exit:

eax = size of the bits buffer, if successful.

eax = 0 if failure.

The above function is called by the graphics interface while creating a DIB via CreateDIBSection.

The purpose of CreateDIBPDevice is the following:

1.    Validate the DIB Header pointed to by the CDP_DIBInfo far pointer. The graphics engine knows what DIB formats it supports and if the DIB information passed by the graphics interface does not conform to one of those formats, the CreateDIBPDevice will return failure.

2. Once the DIB has been validated, the graphics interface expects the graphics engine to fill in the buffer pointed to by the CDP_PDevice far pointer with a DIB PDEVICE structure that will be used as a PDEVICE when drawing on the DIB. The graphics engine then does this. Most of the information that it needs to fill in the PDevice structure comes from the CDP_DIBInfo structure (width, height, format etc.). However, CDP_DIBInfo does not specify how to fill in the deFlags (attributes of the surface) and the deBits (pointer to the bits for the surface) fields. The graphics interface passes these parameters explicitly. CDP_lpBits is the pointer to the bits. The graphics interface passes this in as a NULL> This is because the graphics interface does not know yet what the size of the bits buffer will be.
CDP_Flags is used to build deFlags. The flag value will indicate that the drawing surface is a DIB (as opposed to a DDB or the screen).

3. The graphics engine returns the size needed for the DIB buffer in the eax.

The graphics interface uses the value in eax to allocate a buffer for the bits buffer. Once it has done this, it will patch up the deBits field of the PDevice with the address of the buffer.

The above CreateDIBPDevice is used by display drivers to construct a pdevice for their surface. In this case, the CDP_lpBits will be non null and will point to the memory address of the screen.
The above CreateDIBPDevice is also used internally in the graphics engine while constructing PDevices for DDBs.

---

APPENDIX B

We claim:

1. Apparatus for enabling an application program to use an operating system to create a device-independent bitmap on which the application program may then perform graphics operations, comprising:

means for accessing a first data structure in memory describing a desired format of the device-independent bitmap to be created;

means in communication with the accessing means for creating the device-independent bitmap according to the desired format by calling a function for allocating memory and passing as part of the function call a second data structure defining a device-independent bitmap, the second data structure including a pointer to a memory location in which the bits of the bitmap are stored and a pointer to the second data structure defining the format of the device-independent bitmap;

means for identifying the bitmap to the application program;

means for identifying the bitmap to the operating system; and means for performing graphics operations on the device-independent bitmap in response to a command from the application program directly to the bitmap or indirectly through the operating system.

2. The apparatus of claim 1 wherein the means for creating a device-independent bitmap comprises a function call to a function, wherein the call passes to the function a data structure defining a device-independent bitmap, the data structure including a pointer to a memory location in which the bits of the bitmap are stored and a pointer to a second data structure defining a format of the device-independent bitmap.

3. The apparatus of claim 1 wherein the format of the device-independent bitmap includes a color table and the apparatus further includes means for indicating whether the contents of the color table are indices into a color palette or actual colors.

4. The apparatus of claim 1 including means for identifying a memory location for storing the bits of the bitmap.

5. The apparatus of claim 1 wherein the means for identifying the bitmap to the application program comprises a pointer which points to a buffer that contains the memory location of the bits of the bitmap.

6. A method for enabling an application program to use an operating system to create a device-independent bitmap on which the application program may then perform graphics operations, the method comprising the following steps:

accessing a first data structure describing a desired format for the device-independent bitmap;

creating the bitmap in a memory according to the desired format by calling a function for allocating memory and passing as part of the function call a second data structure defining a device-independent bitmap, the second data structure including a pointer to a memory location in which the bits of the bitmap are stored and a pointer to the first data structure defining the format of the device-independent bitmap;

identifying the bitmap to the application program;

identifying the bitmap to the operating system; and performing graphics operations on the device-independent bitmap in response to a command from the application program directly to the bitmap or indirectly through the operating system.

7. The method of claim 6 in which the step of creating the bitmap comprises:

reserving memory for a device-independent bitmap; and returning a pointer to an address for the reserved memory.

8. The method of claim 7 including identifying to the operating system the means for creating the bitmap.

9. A computer-readable medium having computer-executable instructions for performing the steps recited in claim 6.

10. Apparatus for enabling an application program to use an operating system to create a device-independent bitmap on which the application program may then perform graphics operations, comprising:

a graphics interface within the operating system defining a first graphics function, the first function responsive to a call from the application program for creating a device independent bitmap, the first function including a call to a second graphics function;

a graphics engine defining the second function, the second function responsive to the call from the graphics interface for creating the device independent bitmap in memory;

the graphics engine, in creating the device independent bitmap, returning to the graphics interface means for identifying the bitmap to the application program;

the graphics interface returning to the application program a means for identifying the bitmap to the operating system and the means for identifying the bitmap to the application program; and the graphics engine responsive to a call from the application program or a call from the operating system to perform graphics operations on the device-independent bitmap.

11. The apparatus of claim 10 wherein the call from the first function to the second function passes to the second function a data structure defining a device-independent bitmap, the data structure including a pointer to a memory location in which the bits of the bitmap are stored and a pointer to a second data structure defining a format of the device-independent bitmap.

12. The apparatus of claim 10 wherein the graphics interface and graphics engine are contained within separate modules.

13. The apparatus of claim 10 wherein the graphics interface and graphics engine are contained within a same module.

14. A method for enabling an application program to use an operating system to create a device-independent bitmap on which the application program may then perform graphics operations, the method comprising to following steps:

calling a first graphics function within the operating system for creating a device independent bitmap, the called function including a call to a second graphics function;

calling from the first function to a second function within the operating system for creating the device independent bitmap in memory; and with the second function:

creating the device independent bitmap in memory;

returning from the second function to the first function a means for identifying the bitmap to the application program;

with the first function, returning to the application program a means for identifying the bitmap to the operating system and the means for identifying the bitmap to the application program; and with the second function, performing graphics operations on the device-independent bitmap in response to a command from the application program directly to the bitmap or indirectly through the operating system.

15. The method of claim 14 wherein the call from the first function to the second function passes to the second function a data structure defining a device-independent bitmap, the data structure including a pointer to a memory location in which the bits of the bitmap are stored and a pointer to a second data structure defining a format of the device-independent bitmap.

16. The method of claim 14 wherein the operating system includes a graphics interface containing the first function and graphics engine containing the second function, and the graphics interface and graphics engine are contained within separate modules.

17. The method of claim 14 wherein the operating system includes a graphics interface containing the first function and graphics engine containing the second function, and the graphics interface and graphics engine are contained within a same module.

18. A method for performing graphics operations, the method comprising the following steps:

calling a graphics function to perform a graphics operation on a memory surface and identifying in the call the memory surface;

determining within a graphics driver whether a graphics operation to be performed is of a type that may be performed by an operating system;

determining within the graphics driver, based on the memory surface identified, whether the operating system or the graphics driver will perform the graphics operation;

if the operating system is to perform the graphics operation, having the graphics driver call a function within the operating system to perform the graphics operation on the memory surface; and if the graphics driver is to perform the graphics operation, calling a function within the graphics driver to perform the graphics operation on the memory surface.

19. A computer-readable medium having computer-executable instructions for performing the steps recited in claim 18.

20. A method for performing graphics operations, the method comprising the following steps:

determining within a graphics driver whether a graphics operation to be performed is of a type that may be performed by an operating system; and if so, having the graphics driver call a function within the operating system to perform the graphics operation;

if not, having the graphics driver perform the graphics operation;

creating a device-independent bitmap;

creating a memory device context;

associating the device-independent bitmap with the memory device context; and communicating to the application program a means for identifying the memory device context for use in graphics operations.

* * * * *